(12) United States Patent
Moehrle et al.

(10) Patent No.: US 11,805,306 B2
(45) Date of Patent: Oct. 31, 2023

(54) IMAGE DETECTION UNIT FOR A VEHICLE AND METHOD FOR MANUFACTURING AN IMAGE DETECTION UNIT

(71) Applicant: Robert Bosch GmbH, Stuttgart (DE)

(72) Inventors: Andreas Moehrle, Stuttgart (DE); Johannes Eschler, Weil der Stadt (DE); Moritz Winkler, Waldbronn (DE); Nikolai Bauer, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 45 days.

(21) Appl. No.: 17/455,276

(22) Filed: Nov. 17, 2021

(65) Prior Publication Data

US 2022/0166905 A1 May 26, 2022

(30) Foreign Application Priority Data

Nov. 24, 2020 (DE) .................... 10 2020 214 712.4

(51) Int. Cl.
| | |
|---|---|
| *H04N 23/54* | (2023.01) |
| *B60S 1/02* | (2006.01) |
| *G03B 30/00* | (2021.01) |
| *G02B 7/02* | (2021.01) |
| *H04N 23/55* | (2023.01) |

(52) U.S. Cl.
CPC .............. *H04N 23/54* (2023.01); *B60S 1/026* (2013.01); *G02B 7/028* (2013.01); *G03B 30/00* (2021.01); *H04N 23/55* (2023.01)

(58) Field of Classification Search
CPC ........ H04N 23/54; H04N 23/55; H04N 23/57; H04N 25/70; B60S 1/026; G02B 7/028; G03B 30/00; G03B 17/12
See application file for complete search history.

(56) References Cited

U.S. PATENT DOCUMENTS

| | | | | |
|---|---|---|---|---|
| 2011/0096421 | A1* | 4/2011 | Hirata | F03G 7/065 310/307 |
| 2014/0184899 | A1* | 7/2014 | McKinley | G03B 5/00 348/373 |
| 2019/0361194 | A1* | 11/2019 | Nunnink | H04N 23/50 |
| 2021/0294066 | A1* | 9/2021 | Hirata | G03B 17/55 |
| 2022/0091356 | A1* | 3/2022 | Miller | G02B 7/021 |

FOREIGN PATENT DOCUMENTS

DE 202014011372 U1 10/2019

* cited by examiner

*Primary Examiner* — Nasim N Nirjhar
(74) *Attorney, Agent, or Firm* — NORTON ROSE FULBRIGHT US LLP; Gerard Messina

(57) ABSTRACT

An image detection unit for a vehicle. The image detection unit includes an objective including an electrical contact surface, a sensor carrier including a detection sensor situated on the sensor carrier and an electrical contact point. The detection sensor and the contact point are situated at a surface of the sensor carrier that faces the objective. The image detection unit further includes a flexible contacting element for an electrical connection between the contact surface of the objective and the contact point of the sensor carrier.

12 Claims, 17 Drawing Sheets

IMAGE DETECTION UNIT FOR A VEHICLE AND METHOD FOR MANUFACTURING AN IMAGE DETECTION UNIT

CROSS REFERENCE

The present application claims the benefit under 35 U.S.C. § 119 of German Patent Application No. DE 102020214712.4 filed on Nov. 24, 2020, which is expressly incorporated herein by reference in its entirety.

FIELD

The present invention is directed to an image detection unit for a vehicle and to a method for manufacturing an image detection unit. The subject matter of the present invention is also a computer program.

BACKGROUND INFORMATION

German Patent Application No. DE 20 2014 011 372 U1 describes an imaging device including mechanical zoom, which includes a platform and a camera module and lens module.

SUMMARY

An improved image detection unit for a vehicle and an improved method for manufacturing an image detection unit, further a device that uses this method, and finally a corresponding computer program are provided in accordance with the present invention. Advantageous refinements of and improvements on the basic device disclosed herein are possible with the measures disclosed herein.

An example embodiment of the present invention provides, in particular, a possibility of advantageously supplying components of an image detection unit with electrical power and at the same time of utilizing an installation space of the image detection unit in the best possible way. With the aid of an electrical connection between the objective and the sensor carrier integrated in the image detection unit, it is possible, for example, to keep the dimensions of the image detection device to a minimum. External forces applied to the electrical connection, for example, may advantageously also be avoided.

An image detection unit for a vehicle is provided in accordance with an example embodiment of the present invention, which includes an objective including an electrical contact surface and a sensor carrier including a detection sensor situated on the sensor carrier and an electrical contact point. The detection sensor and the contact point in this case are situated at a surface of the sensor carrier that faces the objective. The image detection unit further includes a flexible contacting element for an electrical connection between the contact surface of the objective and the contact point of the sensor carrier.

The image detection unit may, for example, be implemented as a camera, which may be used, for example, in connection with driving assistance systems in vehicles. The vehicle in this case may, for example, be implemented as a motor vehicle, in particular, a double-track vehicle, for example, as a passenger car, a commercial vehicle or as a truck. Alternatively, the vehicle may, for example, also be implemented as a single-track vehicle. The objective may, for example, include one or multiple lenses, which are advantageously designed to direct light beams. In addition, the objective may, for example, be cylindrically shaped or include cylindrical areas. The contact surface may, for example, be situated at a side wall of the objective. The sensor carrier may, for example, be formed as a circuit board, at which the detection sensor may be situated and which may advantageously function as a control unit. The contacting element may, for example, be implemented as an electrical line and/or may include at least one electrical line. One further component of the image detection unit may advantageously be activated and/or supplied with electrical power via the electrical connection.

According to one specific embodiment of the present invention, the contacting element may be situated helically and additionally or alternatively bent around the objective. The contacting element may, for example, be implemented in the shape of a spiral around the objective. In this way, the contacting element may be advantageously situated in an already available installation space without increasing the size of the image detection unit.

The contacting element may further be formed as a coil spring or as a wave spring. In this way, the electrical connection may be established at a plurality of sections of the objective.

According to one specific embodiment of the present invention, the contacting element may be formed as a cable, in particular, as a ribbon cable. The ribbon cable may, for example, be implemented as a flex cable. The cable may advantageously include at least one line or wire and additionally or alternatively at least one further line or wire.

The image detection unit may further include a cable routing unit, the contacting element being capable of being situated at the objective inside or outside the cable routing unit. The cable routing unit may be formed to route the contacting element. The cable routing unit may, for example, be formed as a cable channel, as a groove or as projection at, for example, an outer side of the objective. In this way, it is possible to safely and stably route the contacting element.

According to one specific embodiment of the present invention, the contacting element may be materially integrally and additionally or alternatively form-fittingly connected to the sensor carrier and additionally or alternatively to the objective. This means that the contacting element may be advantageously glued or, for example, connected as a plug contact for a plug connection or, for example, with the aid of a press connection to the sensor carrier and additionally or alternatively to the objective.

The contacting element may be magnetically connected to the sensor carrier and additionally or alternatively to the objective. The contacting element may advantageously include at least one magnetic plug, via which an assembly may be advantageously simplified. The magnetic plug may advantageously contact the contact surface of the objective and additionally or alternatively the contact point of the sensor carrier.

The image detection unit may include an objective holder connectable to or connected to the sensor carrier for holding the objective. The objective holder may, for example, be formed as part of a housing of the image detection unit. Alternatively, the objective holder may be enclosed by the housing. The objective holder is advantageously screwed to the sensor carrier in order, for example, to lend stability to the sensor carrier. In addition or alternatively, the objective holder is bonded to the objective in such a way that the objective is advantageously unable to slip and as a result, an erroneous detection, for example, of surroundings of the vehicle is avoided.

According to one specific embodiment of the present invention, the image detection unit may include a heating unit for controlling the temperature of at least one lens of the objective, the heating unit being capable of being electrically connected to the contact surface. The heating unit may be advantageously implemented as a lens heater, via which the lens of the objective may, for example, be de-iced at low temperatures.

Furthermore, a method for manufacturing an image detection unit in one previously mentioned variant is provided in accordance with the present invention. In accordance with an example embodiment of the present invention, the method includes a step of providing an objective including a contact surface, a sensor carrier including a detection sensor situated on the sensor carrier and an electrical contact point, the detection sensor and the contact point being situated at a surface of the sensor carrier that faces the objective, and a flexible contacting element for an electrical connection between the contact surface of the objective and the contact point of the sensor carrier. The method further includes a step of mounting the objective, the sensor carrier, the objective holder and the contacting element, the objective being positioned facing the sensor carrier and the contact point of the sensor carrier and the contact surface of the objective being electrically connected to one another.

The method may advantageously simplify an assembly of the image detection unit, so that, for example, a time expenditure may be reduced.

According to one specific embodiment of the present invention, the contacting element may be attached in the step of mounting to the contact surface of the objective. The contacting element may be advantageously pressed onto the contact surface, for example, with the aid of a punch.

Further in the step of mounting, the objective may be moved in at least one direction transverse to a longitudinal axis of the image detection unit, in order to contact a magnetic end of the contacting element supported at the sensor carrier. In a step of aligning, the objective may further be aligned along the longitudinal axis. The objective may be advantageously fixed at an objective holder after mounting.

This method may, for example, be implemented in software or in hardware or in a mixed form of software and hardware, for example, in a control unit.

The approach presented herein further provides a device, which is designed to carry out, activate or implement the steps of a variant of a method presented herein in corresponding units. With this embodiment variant of the present invention in the form of a device as well, it is possible to quickly and efficiently achieve the object underlying the present invention.

For this purpose, the device may include at least one processing unit for processing signals or data, at least one memory unit for storing signals or data, at least one interface to a sensor or to an actuator for reading in sensor signals from the sensor or for outputting data signals or control signals to the actuator and/or at least one communication interface for reading in or outputting data, which are embedded in a communication protocol. The processing unit may, for example, be a signal processor, a microcontroller or the like, the memory unit capable of being a flash memory, an EEPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A device in the present case may be understood to mean an electrical device which processes sensor signals and, as a function thereof, outputs control signals and/or data signals. The device may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made at least partly of discrete components. In a software design, the interfaces may be software modules, which are present, for example, on a microcontroller alongside other software modules.

Also advantageous is a computer program product or computer program including program code, which may be stored on a machine-readable medium or memory medium, such as a semiconductor memory, a hard disk memory or an optical memory, and which is used for carrying out, implementing and/or activating the steps of the method according to one of the previously described specific embodiments, in particular, when the program product or program is executed on a computer or a device.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

Figure 1:
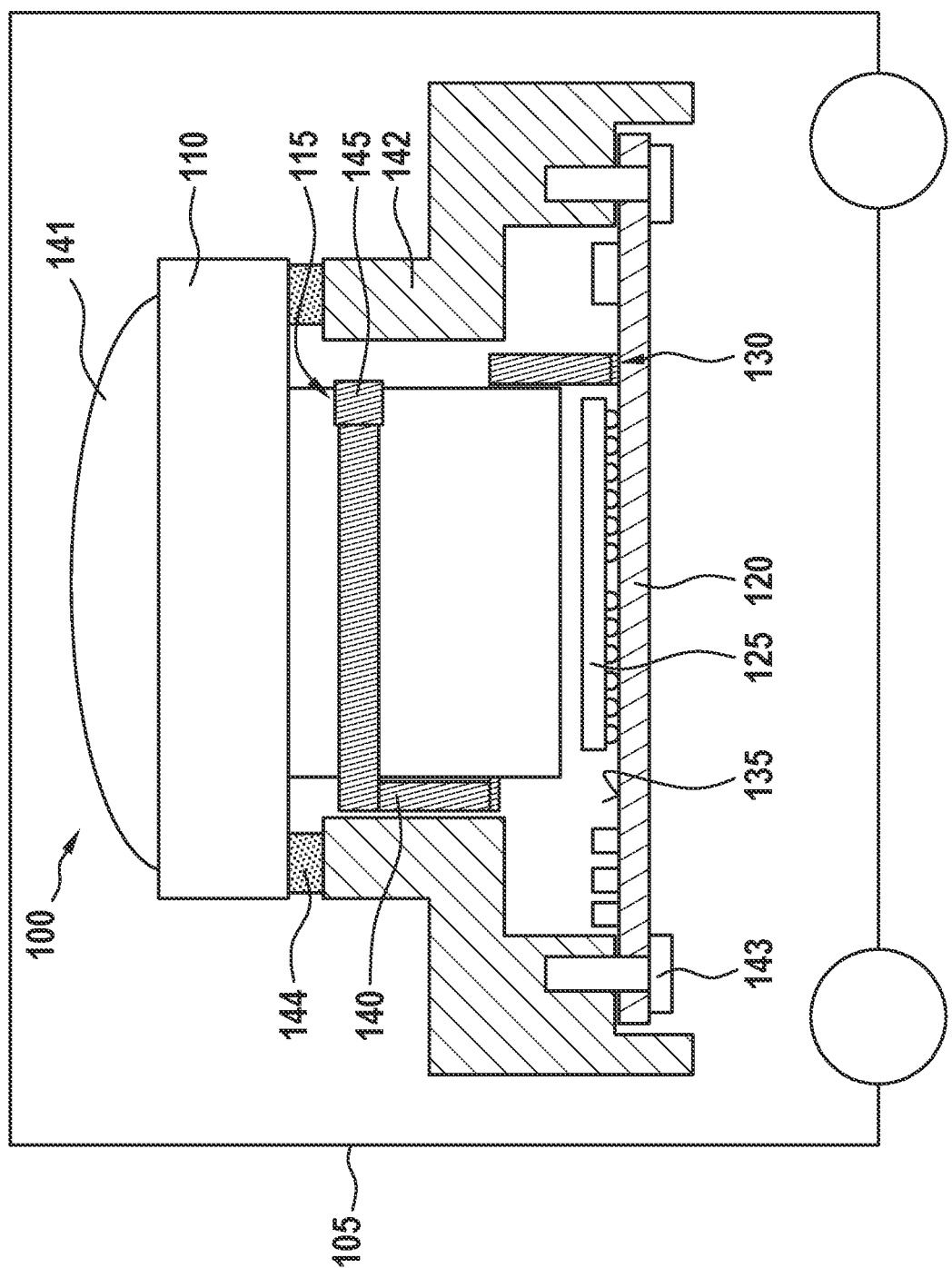
FIG. 1 schematically shows a representation of an image detection unit according to one exemplary embodiment of the present invention FIG. 2 schematically shows a representation of a contacting element according to one exemplary embodiment for an image detection unit, in accordance with the present invention.

In the following description of preferred exemplary embodiments of the present invention, identical or similar reference numerals are used for elements which are represented in the various figures and act similarly, a repeated description of these elements being omitted.

FIG. 1 schematically shows a representation of an image detection unit 100 according to one exemplary embodiment. Image detection unit 100 is implemented, for example, in a vehicle 105, which is formed according to this exemplary embodiment as a passenger car, a commercial vehicle or as a truck. Image detection unit 100 in this case includes an objective 110 including an electrical contact surface 115. Image detection unit 100 further includes a sensor carrier 120 including a detection sensor 125 situated on sensor carrier 120 and including an electrical contact point 130. Detection sensor 125 and contact point 130 in this case are situated at a surface 135 of sensor carrier 120 that faces objective 110. Image detection unit 100 further includes a flexible contacting element 140 for an electrical connection between contact surface 115 of objective 110 and contact point 130 of sensor carrier 120. Contacting element 140 is designed, for example, to establish an electrical connection to a heating unit not represented here, in order, for example, to control the temperature of at least one lens 141 of objective 110. The heating unit in this case is electrically connected to contact surface 115.

According to one exemplary embodiment, image detection unit 100 includes an objective holder 142 connectable to or connected to sensor carrier 120 for holding objective 110. Objective holder 142 in this case is screwed to sensor carrier 120, for example, with the aid of a connecting element 143 and/or is bonded to objective 110. For this purpose, an adhesive 144 is usable, which acts in a tolerance-compensating manner. Objective holder 142 according to this exemplary embodiment is formed in a step-like manner and/or as part of a housing of image detection unit 100.

According to this exemplary embodiment, contacting element 140 is formed as a cable such as, for example, as a ribbon cable. The cable is also referred to as a flex cable and includes, for example, one or multiple lines or wires. According to this exemplary embodiment, contacting element 140 is situated around objective 110. For this purpose, contacting element 140 is merely bent, for example. In addition or alternatively, contacting element 140 is situated helically around objective 110, as is depicted, for example, in one of the following figures. Contacting element 140 is optionally implemented or implementable in the shape of a spiral. For example, contacting element 140 is materially integrally connected, for example, glued, and/or form-fittingly connected, for example, with the aid of a press connection or a plug connection, to sensor carrier 120 and/or to objective 110. Alternatively, contacting element 140 is magnetically connected to sensor carrier 120 and or to objective 110, for example with the aid of a magnetic plug. According to this exemplary embodiment, contacting element 140 includes a plug at one end 145, which is formed, for example, as a plug contact and contacts contact surface 115 in order to establish the electrical connection. Image detection unit 100 optionally includes a cable routing element not depicted here, at which contacting element 140 is situated. The cable routing unit is implemented or implementable, for example, as a channel or, for example, as a groove.

In other words, according to this exemplary embodiment, a structure of a camera module is presented that includes an integrated power supply of objective 110 with the aid of contacting element 140 referred to as a flex cable. Contacting element 140 enables a direct cable connection and/or flexible contacting between objective 110 and sensor carrier 120 referred to as a circuit board that includes an optional plug or contact pad, in order, for example, to improve a handling during an active alignment process, which is also referred to as "active alignment."

Image detection unit 100 described herein is used, for example, in connection with automobile camera systems, for example, cameras in an exterior installation, such as near field cameras, in the consumer sector, for example, in connection with smartphones or consumer cameras, for professional applications. Image detection unit 100 is further used, for example, in connection with imaging systems, which require a tolerance compensation between objective 110 and detection sensor 125, as well as an electrical connection between objective 110 and sensor carrier 120.

According to this exemplary embodiment, an image detection unit 100 is described, which enables a power supply of an electrical consumer in objective 110 which, according to this exemplary embodiment is the heating unit not depicted here. In this case, a height difference between sensor carrier 120 and objective 110 is flexibly bridgeable for contacting these two components via contacting element 140, so that a movement distance of objective 110 is included during, for example, focusing. An application of an external force on objective 110 is avoided and, as a result, an alignment accuracy is not impaired.

According to this exemplary embodiment, the electrical connection between sensor carrier 120 and objective 110 is implemented with the aid of contacting element 140. In this case, contacting element 140 is designed, for example, in such a way that it is bent at multiple points. As a result, it is formed, for example, with a rectangular profile. One advantage of this geometry is, for example, a bridging of the height difference between a lower and an upper contact of contacting element 140.

In additional or alternatively, contacting element 140 is helically situated, as is depicted in one of the following figures, so that with this geometry it is equally possible to flexibly compensate for a height difference.

Figure 2:
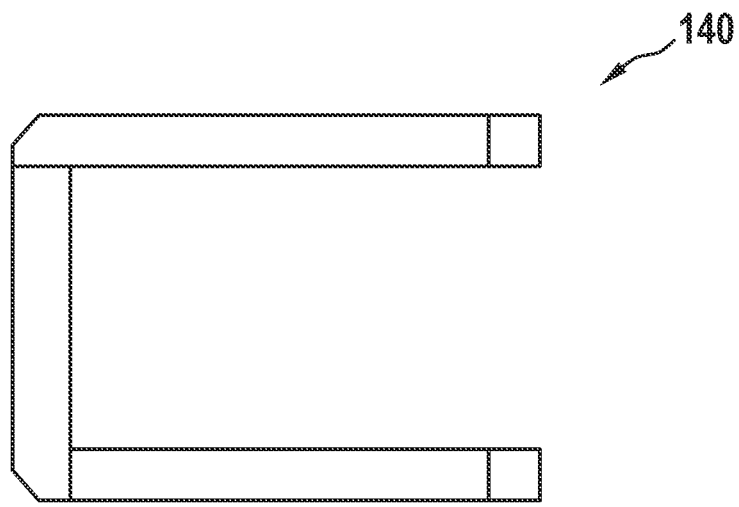

FIG. 2 schematically shows a representation of a contacting element 140 according to one exemplary embodiment for an image sensing unit. Contacting element 140 represented here corresponds to contacting element 140 described in FIG. 1, and is accordingly usable in the image detection unit, as it has also been described in FIG. 1. Contacting element 140 represented according to this exemplary embodiment is a doubly bent ribbon cable, which is optionally wound in the form of a helix around the objective of the image detection unit.

Figure 3:
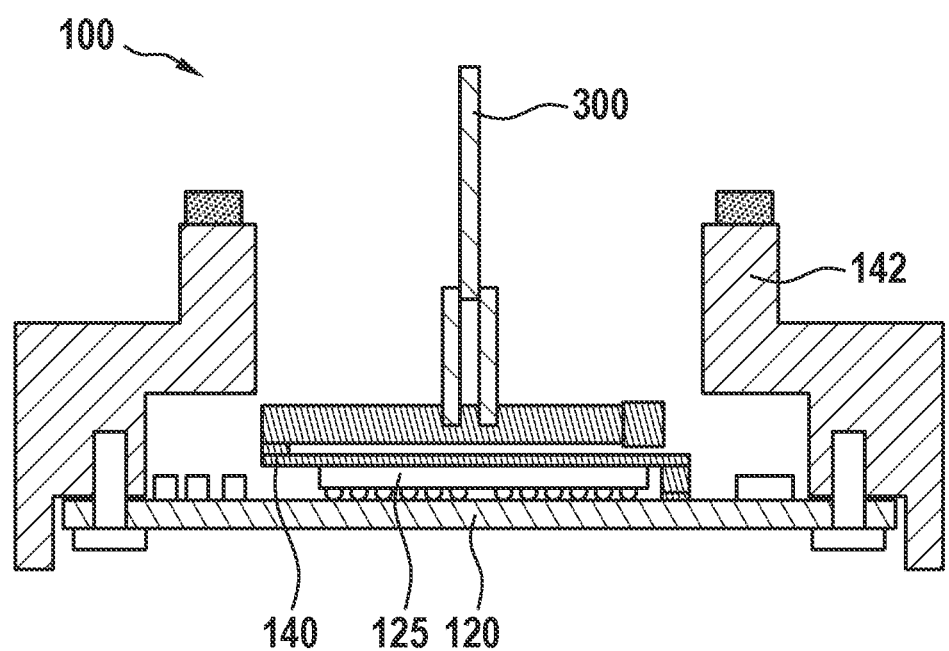
FIG. 3 schematically shows one exemplary embodiment of an image detection unit in one temporary manufacturing state, in accordance with the present invention.

FIG. 3 schematically shows a representation of one exemplary embodiment of image detection unit 100 in one temporary manufacturing state. Image detection unit 100 is similar to image detection unit 100 described in FIG. 1 and differs therefrom merely in such a way that the manufacturing state is represented during a method for manufacturing image detection unit 100, as it is explained in greater detail in one of the following figures. Thus, the objective according to this exemplary embodiment is not yet mounted. Instead, contacting element 140 according to this exemplary embodiment is already fastened at sensor carrier 120. Contacting element 140 represented here further corresponds to contacting element 140 described in FIG. 2. According to this exemplary embodiment, sensor carrier 120 is already connected to objective holder 142 as well as to detection sensor 125.

According to this exemplary embodiment, a gripping tool 300 is further represented, which is designed to lift contacting element 140 at least piecewise in order to be able to insert the objective. Contacting element 140 is implemented merely by way of example as a multiply bent ribbon cable.

In other words, image detection unit 100 is assembled, i.e., manufactured, in such a way that gripping tool 300 initially extracts contacting element 140 from objective holder 142 formed or formable as a housing and moves it into an insertion position. The objective is subsequently insertable, for example, before contacting element 140 is connected to the objective. After being connected, the objective is alignable, for example. Alternatively, contacting element 140 is pre-mounted in such a way that an extraction is not necessary, since contacting element 140 is fixed temporarily at objective holder 142, as is depicted, for example, in one of the following figures.

Figure 4:
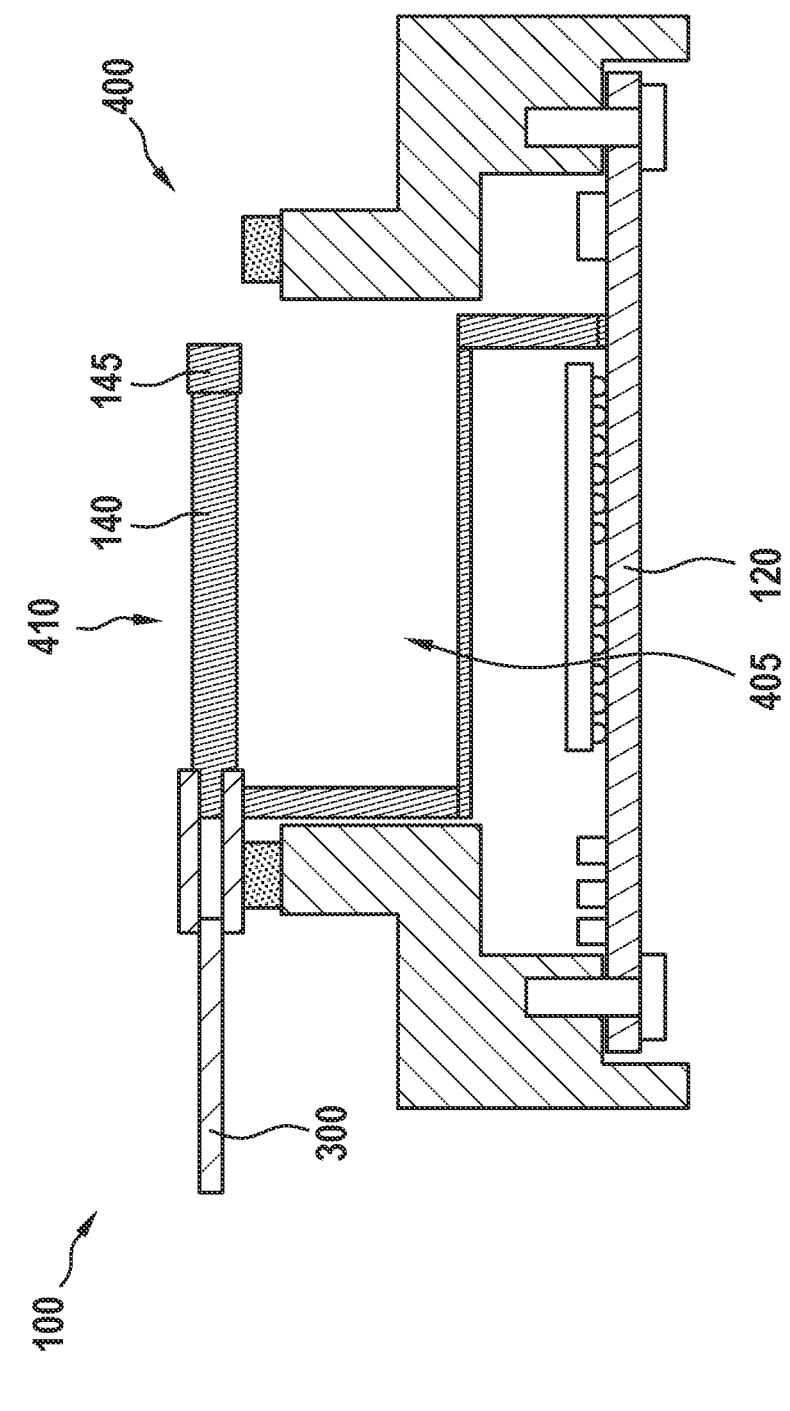
FIG. 4 schematically shows a representation of one exemplary embodiment of an image detection unit in one temporary manufacturing state, in accordance with the present invention.

FIG. 4 schematically shows a representation of one exemplary embodiment of an image detection unit 100 in one temporary manufacturing state. Image detection unit 100 represented here corresponds to image detection unit 100 described in FIG. 3. The manufacturing state represented here is shown, for example, as a continuation of the manufacturing state described in FIG. 3. Gripping tool 300 according to this exemplary embodiment holds contacting element 140 in an insertion position 400 in order to insert the objective. In the process, gripping tool 300 holds contacting element 140 in such a way that the objective is insertable into an insertion opening 405 of image detection unit 100 and end 145 of contacting element 140 is connectable to the contact surface of the objective. In order to achieve this, gripping tool 300 holds a section 410 of contacting element 140 parallel or at least approximately parallel to sensor carrier 120.

Figure 5:
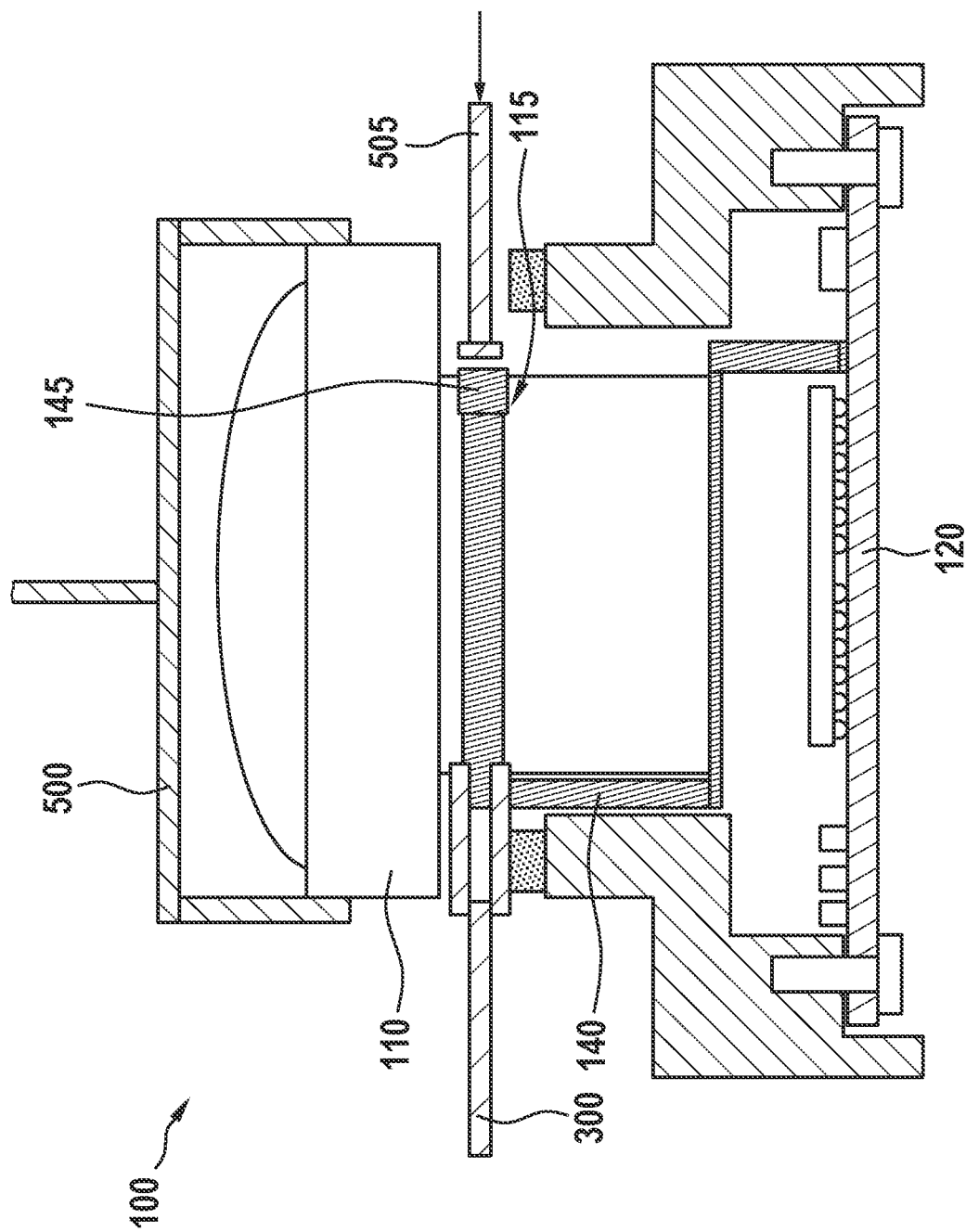
FIG. 5 schematically shows a representation of one exemplary embodiment of an image detection unit in one temporary manufacturing state, in accordance with the present invention.

FIG. 5 schematically shows a representation of one exemplary embodiment of an image detection unit 100 in one temporary manufacturing state. Image detection unit 100 represented here corresponds according to this exemplary embodiment to image detection unit 100 described in FIG. 4. The manufacturing state represented here is shown, for example, as a continuation of the manufacturing state described in FIG. 4. According to this exemplary embodiment, objective 110 is inserted, for example, with the aid of a gripping arm 500 into image detection unit 100 and, for example, held in an intermediate position until contacting element 140 has been pressed onto objective 110. The pressing in this case occurs, for example, with the aid of a punching tool 505, which is designed to press end 145 of contacting element 140 against contact surface 115. In the process, gripping tool 300 holds contacting element 140 until the pressing process is completed and, for example, end 145 of contacting element 140 does not separate from contact surface 115.

Figure 6:
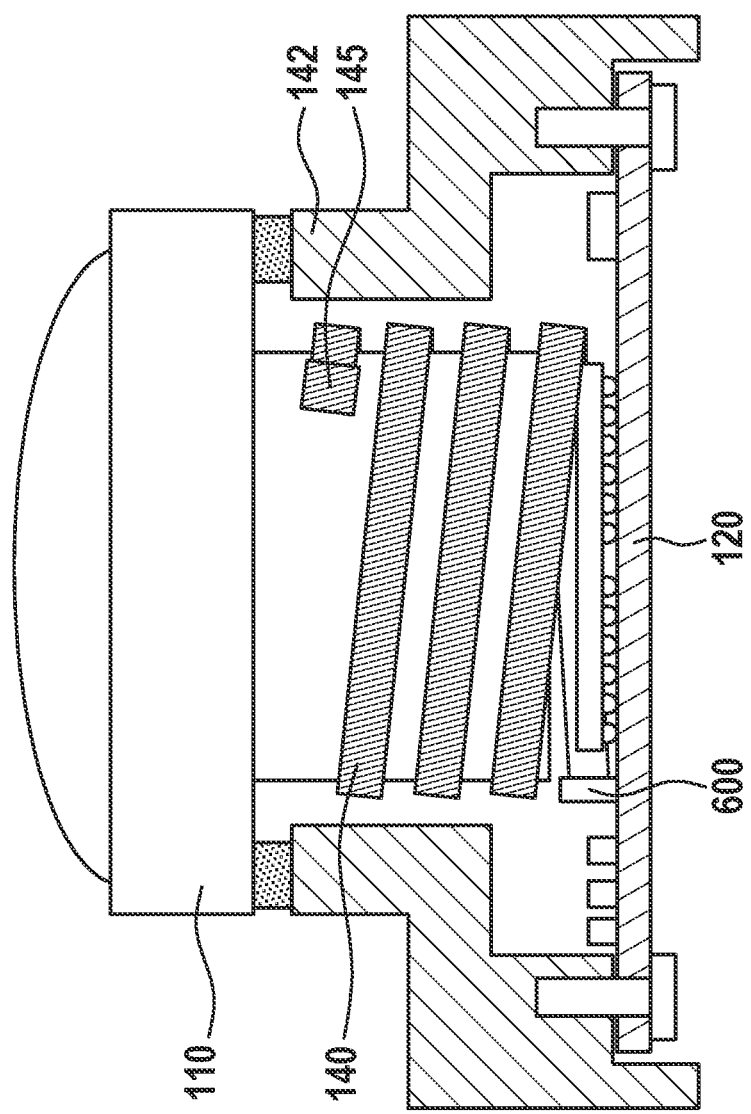
FIG. 6 schematically shows a representation of one exemplary embodiment of an image detection unit, in accordance with the present invention.

FIG. 6 schematically shows a representation of one exemplary embodiment of an image detection unit 100. Image detection unit 100 represented here is similar to image detection unit 100 described in FIG. 1. Merely a shape of contacting element 140 differs according to this exemplary embodiment in such a way that here it is implemented in the shape of a helix. This means that contacting element 140 is wound around objective 110 of image detection unit 100. End 145 of contacting element 140 in this case is situated at a cylindrical section of objective 110. Objective 110 according to this exemplary embodiment is implemented overall in the shape of a mushroom. Contacting element 140 according to this exemplary embodiment is connected with a side 600 opposite end 145 to sensor carrier 120. The connection of end 145 to objective 110 and/or the connection of side 600 to sensor carrier 120 is/are magnetically implemented, for example.

Figure 7:
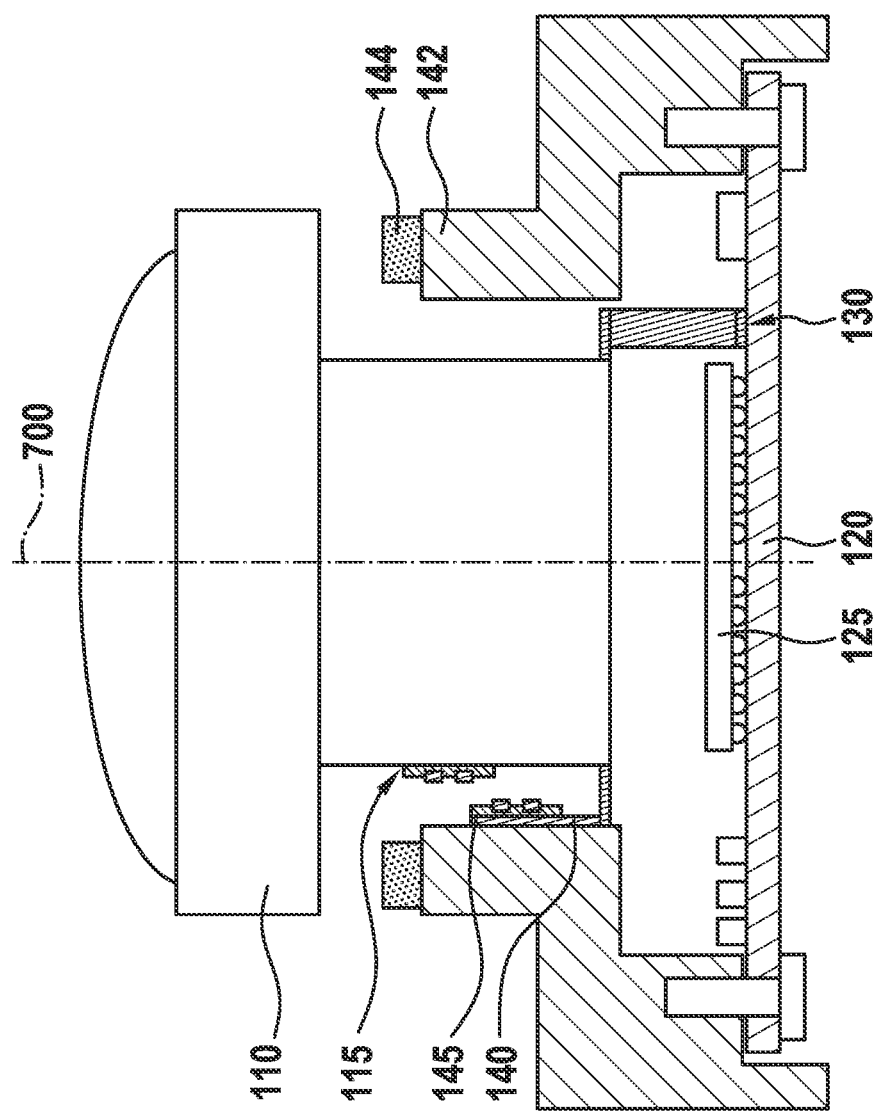
FIG. 7 schematically shows a representation of one exemplary embodiment of an image detection unit in one temporary manufacturing state, in accordance with the present invention.

FIG. 7 schematically shows a representation of one exemplary embodiment of an image detection unit 100 in one temporary manufacturing state. According to this exemplary embodiment, image detection unit 100 is depicted prior to an insertion, i.e., prior to contacting. Image detection unit 100 is similar to image detection unit 100 described in FIG. 1. Merely end 145 of contacting element 140 according to this exemplary embodiment is formed as a magnetic plug, which interacts with contact surface 115 implemented as the counterpart of the magnetic plug when the magnetic plug and the counterpart move close to one another. Up to that point, end 145 is stored temporarily at objective 142. In the manufacturing state represented here, objective 110 is situated in a mounting position, in which objective 110 is inserted into image detection unit 100 along a longitudinal axis 700 of image detection unit 100. Longitudinal axis 700 in this case extends according to this exemplary embodiment transversely, for example, normally or perpendicularly to sensor carrier 120 and/or to detection sensor 125.

In other words, image detection unit 100 according to this exemplary embodiment is described including the flexible contacting to the electrical power supply of objective 110 with the aid of contacting element 140 and magnetic plug connector. According to this exemplary embodiment, a service life and/or a reliability of image detection unit 100 is improved.

In order not to exert any force on objective 110 during manufacture and to thereby impair a focusing, a force-free and tolerance-compensating contacting is implemented between sensor carrier 120 and objective 110 with the aid of contacting element 140. This contacting enables the supply of electrical power, for example, to an integrated lens heater, which is referred to here as a heating unit. Alternatively, the contacting is implementable merely by way of example also in connection with autofocus functions, active image stabilization, variable apertures or the like.

According to this exemplary embodiment, image detection unit 100 includes a folded contacting element 140 implemented as a ribbon cable, which is attached at sensor carrier 120 and includes at its upper end 145, for example, a (ferro-)magnetic plug connector. The counterpart of the magnetic plug connector is attached at the lateral area, i.e., at contact surface 115, of objective 110 or of an objective barrel. The objective barrel according to this exemplary embodiment is formed as a tubular section of objective 110.

A position of the plug connector on the circuit board side, i.e., of end 145 of contacting element 140, is merely optionally selected in such a way that when mounting the objective, the plug connector is contacted by an additional movement of objective 110 directed radially outwardly with respect to longitudinal axis 700. Finally, objective 110 is actively aligned and adhesive 144 is optionally cured. Alternatively, contacting element 140 is wound circularly and includes a magnetic plug connector situated at upper end 145.

Figure 8:
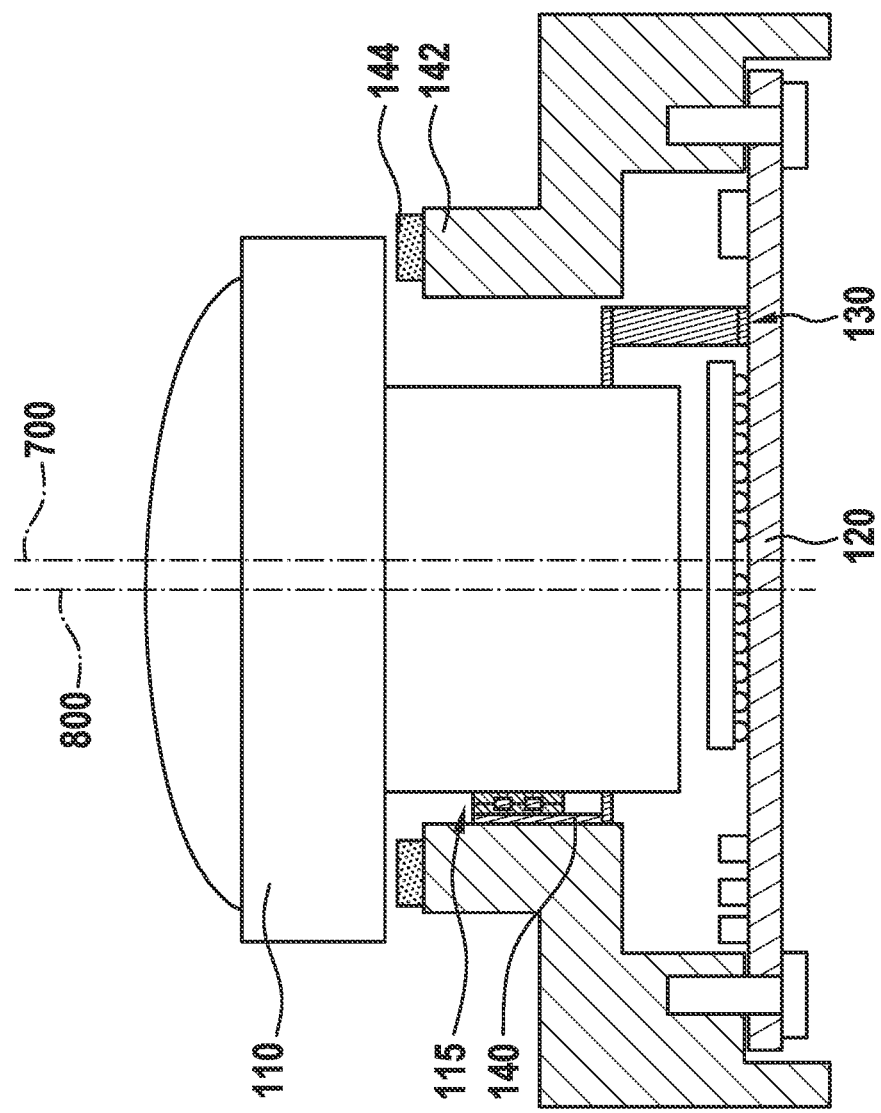
FIG. 8 schematically shows a representation of one exemplary embodiment of an image detection unit in one temporary manufacturing state, in accordance with the present invention.

FIG. 8 schematically shows a representation of one exemplary embodiment of an image detection unit 100 in one temporary manufacturing state. Image detection unit 100 represented here corresponds to image detection unit 100 described in FIG. 7. The only difference with respect to the manufacturing state is, that objective 110 is situated offset to longitudinal axis 700 as compared to objective 110 represented in FIG. 7, so that contacting element 140 contacts contact surface 115. In other words, in the manufacturing state shown in FIG. 8, an objective axis 800 extending longitudinally through objective 110 is parallel to longitudinal axis 700, since objective 110 has been or is moved transversely to longitudinal axis 700, in order to establish the electrical connection. As a result of its magnetic connection, contacting element 140 adheres to contact surface 115. According to the manufacturing state shown in FIG. 8, image detection unit 100 is represented in the contacted state, however, objective 110 is not yet aligned.

Figure 9:
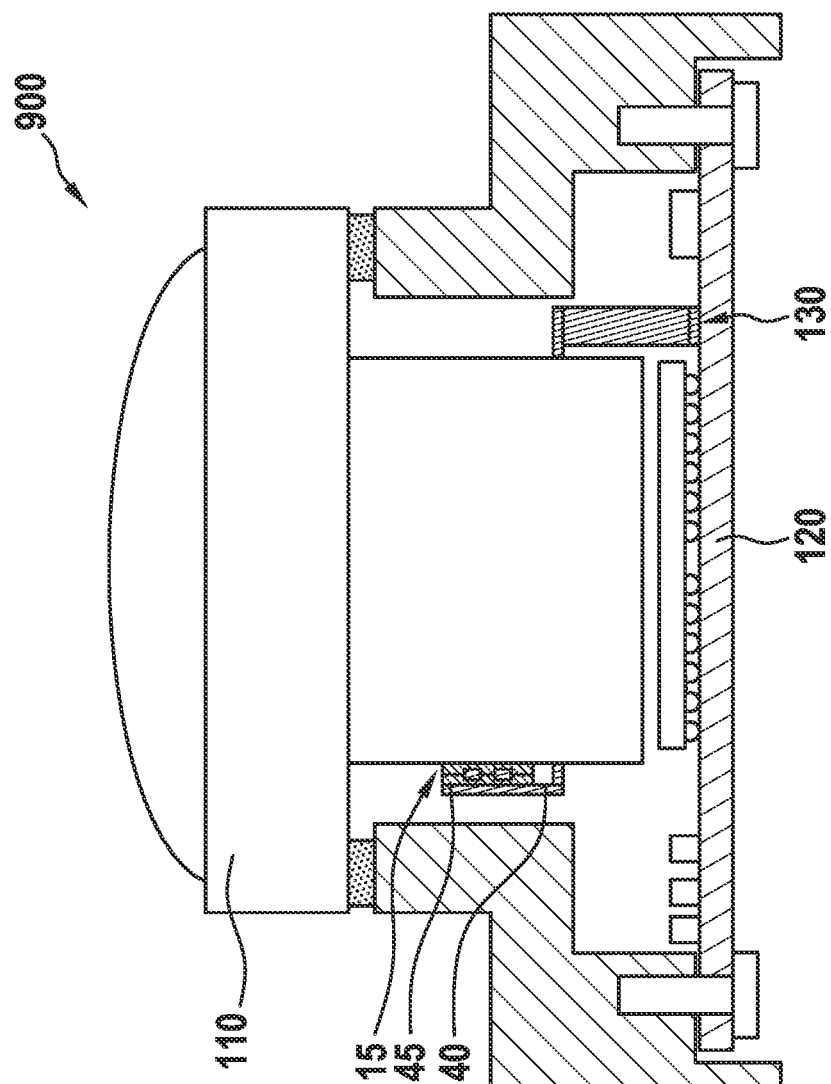
FIG. 9 schematically shows a representation of one exemplary embodiment of an image detection unit, in accordance with the present invention.

FIG. 9 schematically shows a representation of one exemplary embodiment of an image detection unit 100. Image detection unit 100 represented here corresponds to or is similar to image detection unit 100 described in FIG. 1. Merely end 145 of contacting element 140 according to this exemplary embodiment is formed as a magnetic plug, which interacts with contact surface 115 implemented as the counterpart of the magnetic plug. In this case, image detection unit 100 represented here is manufactured, for example, in a manner in which it has been described in FIG. 7 or 8. This means that objective 110 according to this exemplary embodiment is situated in an operating position 900 and image detection unit 100 is operational. According to the manufacturing state shown in FIG. 9, image detection unit 100 is represented in the contact state and objective 110 is aligned, which corresponds to operating position 900.

Figure 10:
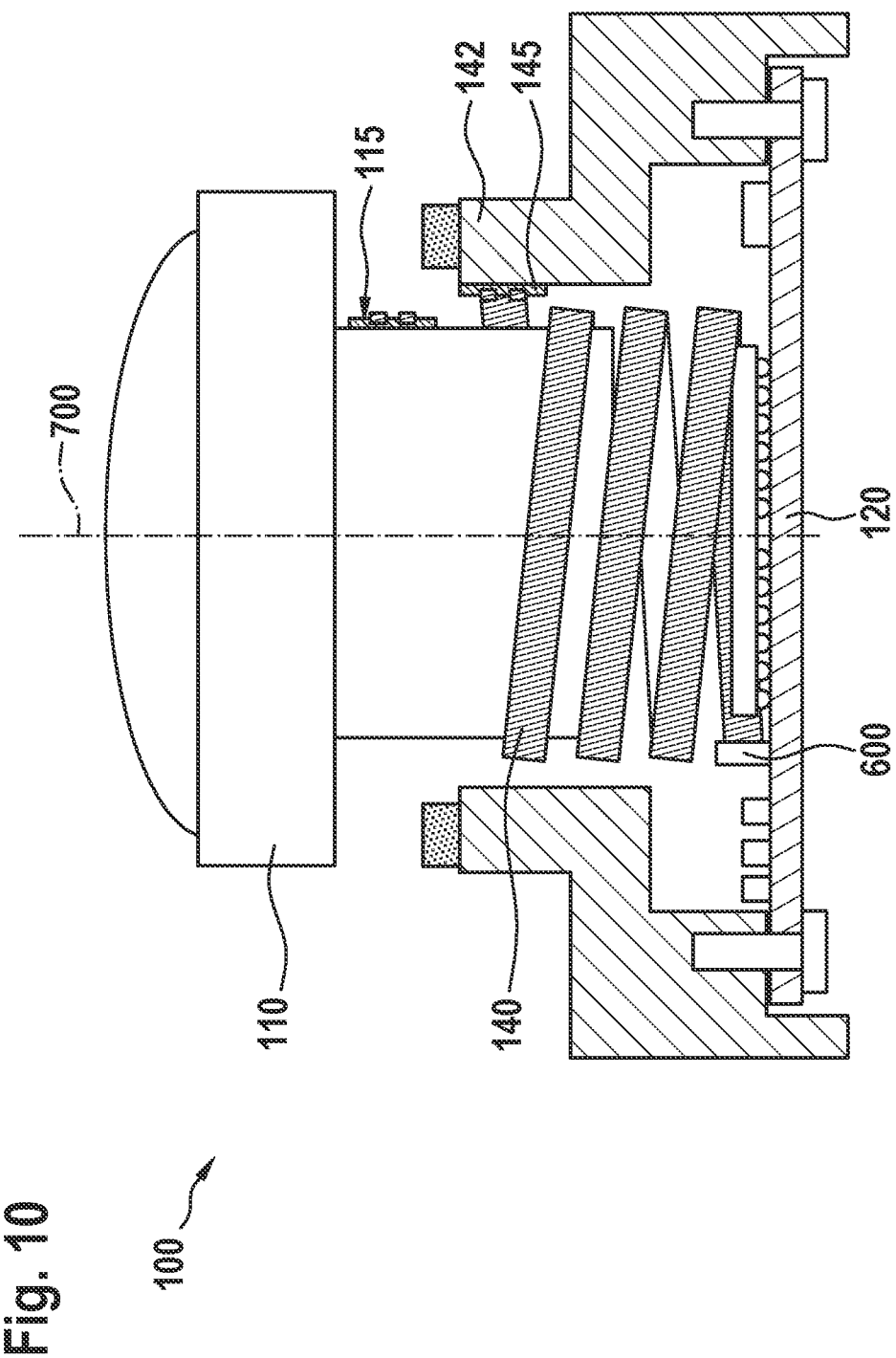
FIG. 10 schematically shows a representation of one exemplary embodiment of an image detection unit in one temporary manufacturing state, in accordance with the present invention.

FIG. 10 schematically shows a representation of one exemplary embodiment of an image detection unit 100 in one temporary manufacturing state. Image detection unit 100 represented here is similar to image detection unit 100 described in FIG. 6. Here, too, contacting element 140 is helically formed and includes a magnetic plug. As also in the manufacturing state represented in FIG. 7, end 145 of contacting element 140 according to this exemplary embodiment is formed as a magnetic plug, which interacts with contact surface 115 implemented as the counterpart of the magnetic plug when the magnetic plug and the counterpart move close to one another. Up to that point, end 145 according to this exemplary embodiment is also stored temporarily at objective holder 142. According to this exemplary embodiment, objective 110 is inserted along longitudinal axis 700 in order to produce image detection unit 100. Image detection unit 100 is represented in FIG. 10 prior to contacting.

Figure 11:
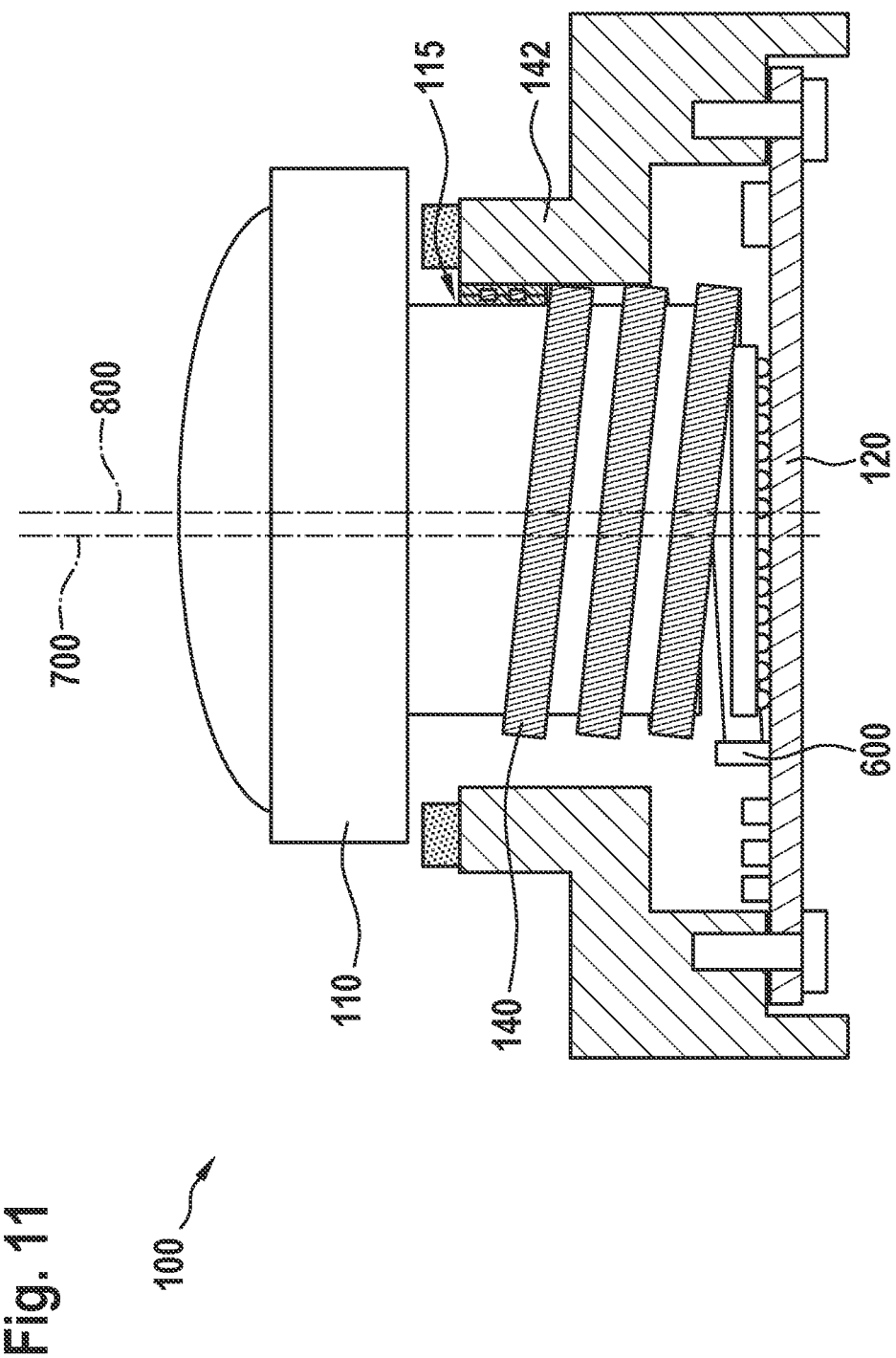
FIG. 11 schematically shows a representation of one exemplary embodiment of an image detection unit in one temporary manufacturing state, in accordance with the present invention.

FIG. 11 schematically shows a representation of one exemplary embodiment of an image detection unit 100 in one temporary manufacturing state. Image detection unit 100 represented here is similar to image detection unit 100 described in FIG. 10. The only difference is that objective 110 is situated offset to longitudinal axis 700 as compared to objective 110 represented in FIG. 10, so that contacting element 140 contacts contact surface 115. In other words, an objective axis 800 according to this exemplary embodiment extending longitudinally through objective 110 is parallel to longitudinal axis 700, since objective 110 has been moved or is moved transversely to longitudinal axis 700 in order to establish the electrical connection. As a result of its magnetic connection, contacting element 140 adheres at contact surface 115. According to the manufacturing state shown in FIG. 11, image detection unit 100 is represented in the contacted state, however, objective 110 is not aligned.

Figure 12:
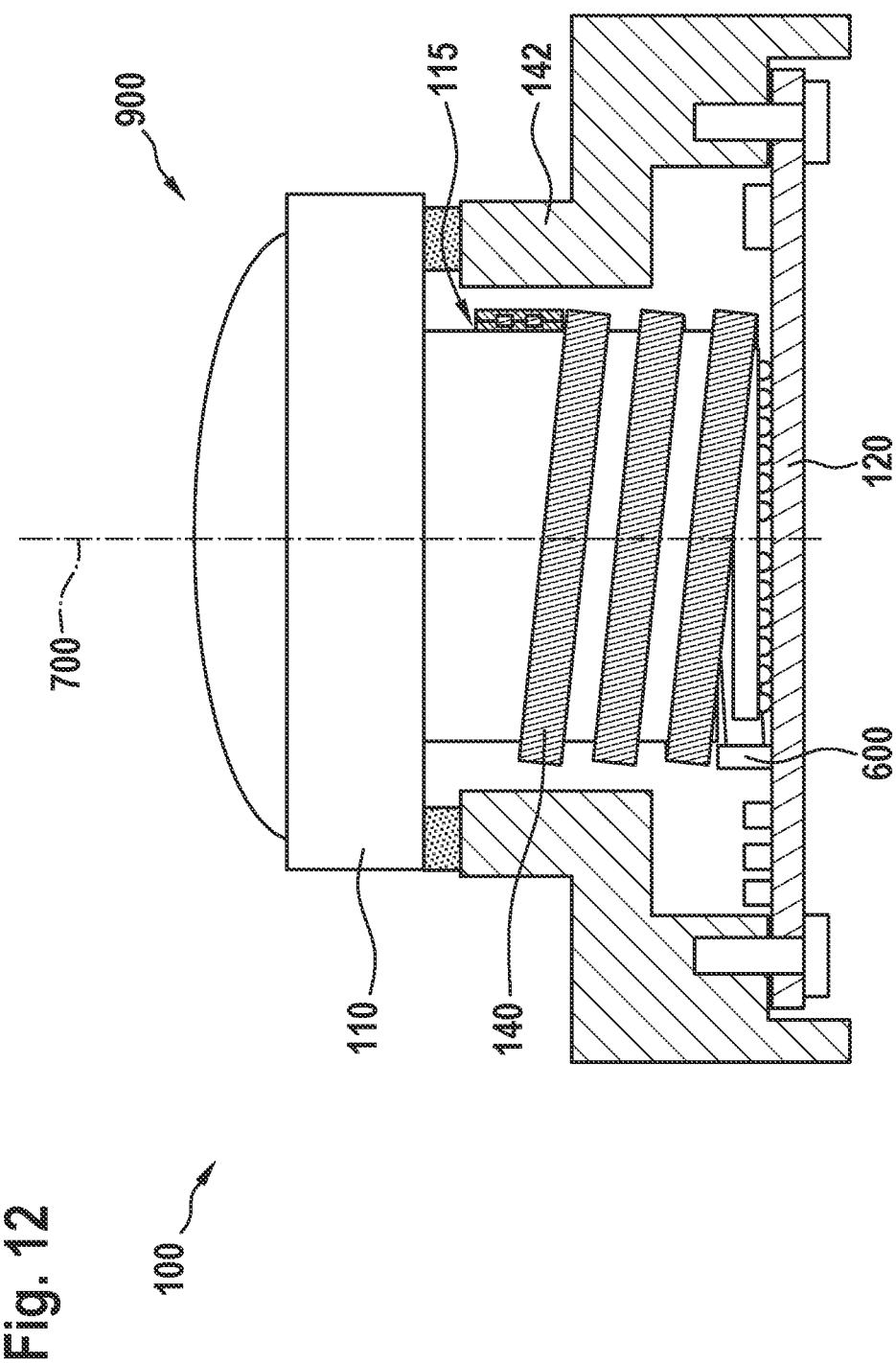
FIG. 12 schematically shows a representation of one exemplary embodiment of an image detection unit, in accordance with the present invention.

FIG. 12 schematically shows a representation of one exemplary embodiment of an image detection unit 100. Image detection unit 100 represented here is similar to image detection unit 100 described in FIG. 6. Contacting element 140 according to this exemplary embodiment is also implemented in the shape of a helix. This means that contacting element 140 is wound around objective 110 of image detection unit 100. End 145 of contacting element 140 according to this exemplary embodiment is situated at the cylindrical section of objective 110. Merely the type of end 145 of contacting element 140 differs as compared to the end described in FIG. 6. According to this exemplary embodiment, image detection unit 100 is implemented as a product of the manufacturing process described in FIGS. 10 and 11. This means that objective 110 in FIG. 12 is situated in an operating position 900 and image detection unit 100 is operational. In this case, image detection unit 100 is represented in the contacted state and objective 110 is shown aligned, which corresponds to operating position 900.

Figure 13:
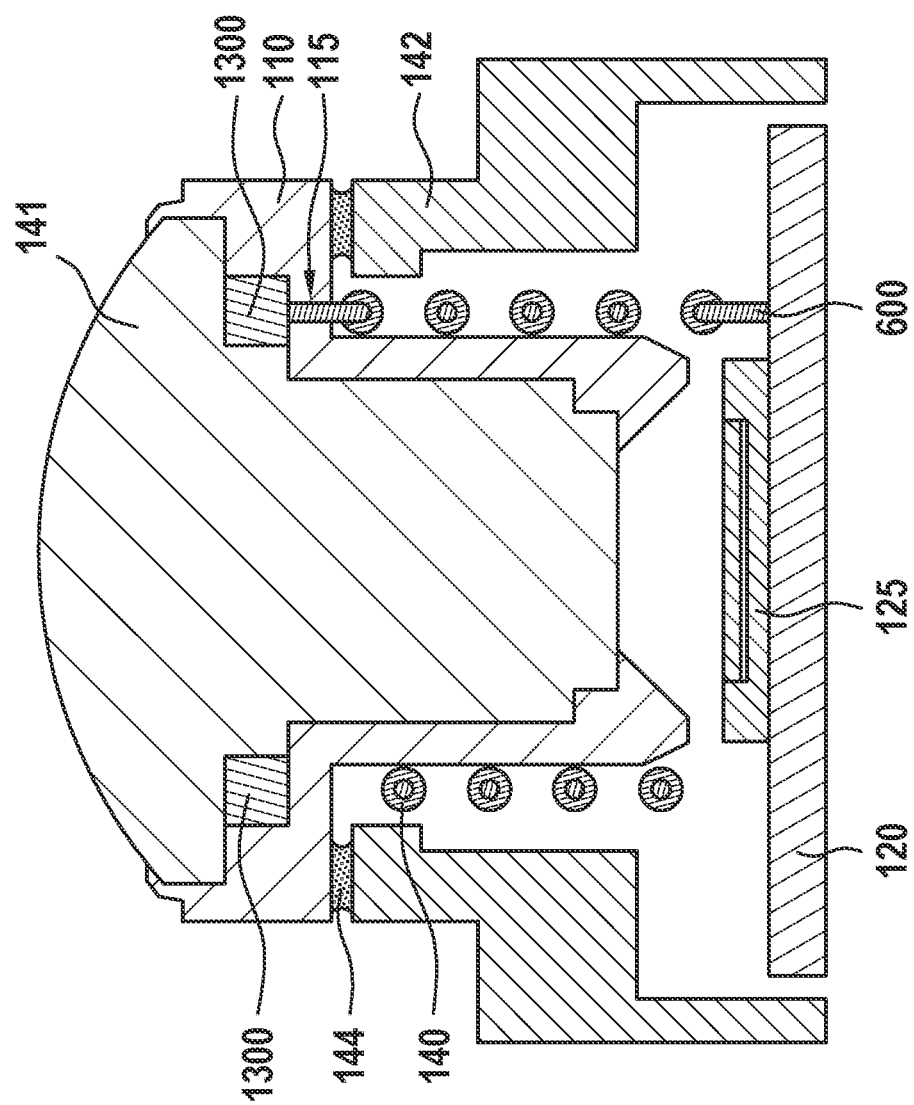
FIG. 13 schematically shows a sectional view of one exemplary embodiment of an image detection unit, in accordance with the present invention.

FIG. 13 schematically shows a sectional representation of one exemplary embodiment of an image detection unit 100. Image detection unit 100 represented here corresponds to or is similar to, for example, image detection unit 100 described in FIG. 1. According to this exemplary embodiment, contacting element 140 is helically formed, for example, as a coil spring, which is situated around objective 110 in order to create an electrical connection between sensor carrier 120 and heating unit 1300. For example, heating unit 1300 extends as one piece around at least one lens 141 of objective 110. According to this exemplary embodiment, heating unit 1300 is situated inside an objective housing 1305, which is formed in order to protect the at least one lens 141 from external influences. According to this exemplary embodiment, contacting element 140 is merely optionally electrically connected to heating unit 1300 with the aid of a line passing through contact surface 115. At sensor carrier 120, a linearly designed side 600 of contacting element 140 opposite heating unit 1300 contacts sensor carrier 120 in order to establish the electrical connection.

In other words, a camera-internal contacting between sensor carrier 120 and objective 110 is presented in this exemplary embodiment with the aid of a routed cable connection. The cable connection is referred to here as a contacting element 140.

According to this exemplary embodiment, the implementation of the power supply of heating element 1300 in objective 110 is described. In this case, the electrical connection is implemented between sensor carrier 120 and objective 110. The live cable, referred to here as contacting element 140, and which is formed, for example, either as a two-core conductor or as two separate conductors, is positioned, for example, via a cable routing inside image detection unit 100 designatable as a camera module. A movement of objective 110 during a focusing is compensated for by an elastic deformation of contacting element 140. In a focused position, contacting element 140 assumes an original state. Contacting element 140 is formed, for example, as a coil spring, which is also referred to as a helix, or has another axially elastic contour such as, for example, the shape of a wave spring. A routing of contacting element 140 of the electrical connection is implemented, for example, as a hollow contour within or, for example, outside (added) of the contour of the cable routing. Contacting element 140 is, for example, materially integrally connected by gluing or form-fittingly connected with the aid of a press connection or a plug contact or, for example, with the aid of an intermediate element such as, for example, a contacting clamping ring, to sensor carrier 120 and objective 110.

Figure 14:
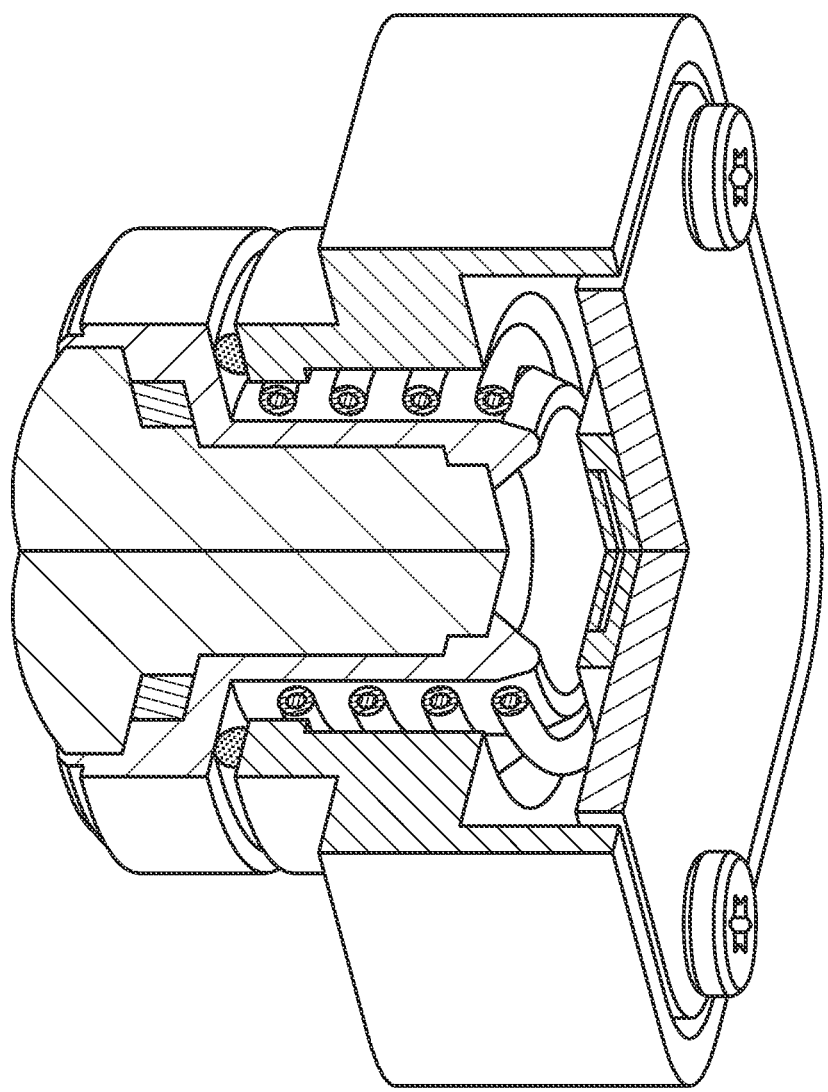
FIG. 14 shows a three-dimensional partial sectional view of one exemplary embodiment of an image detection unit, in accordance with the present invention.

FIG. 14 shows a three-dimensional partial sectional view of one exemplary embodiment of an image detection unit 100. Image detection unit 100 represented here corresponds to image detection unit 100 described in FIG. 13. In the representation of FIG. 14, a cutout, through which the interior of image detection unit 100 is visible, is graphically executed.

Figure 15:
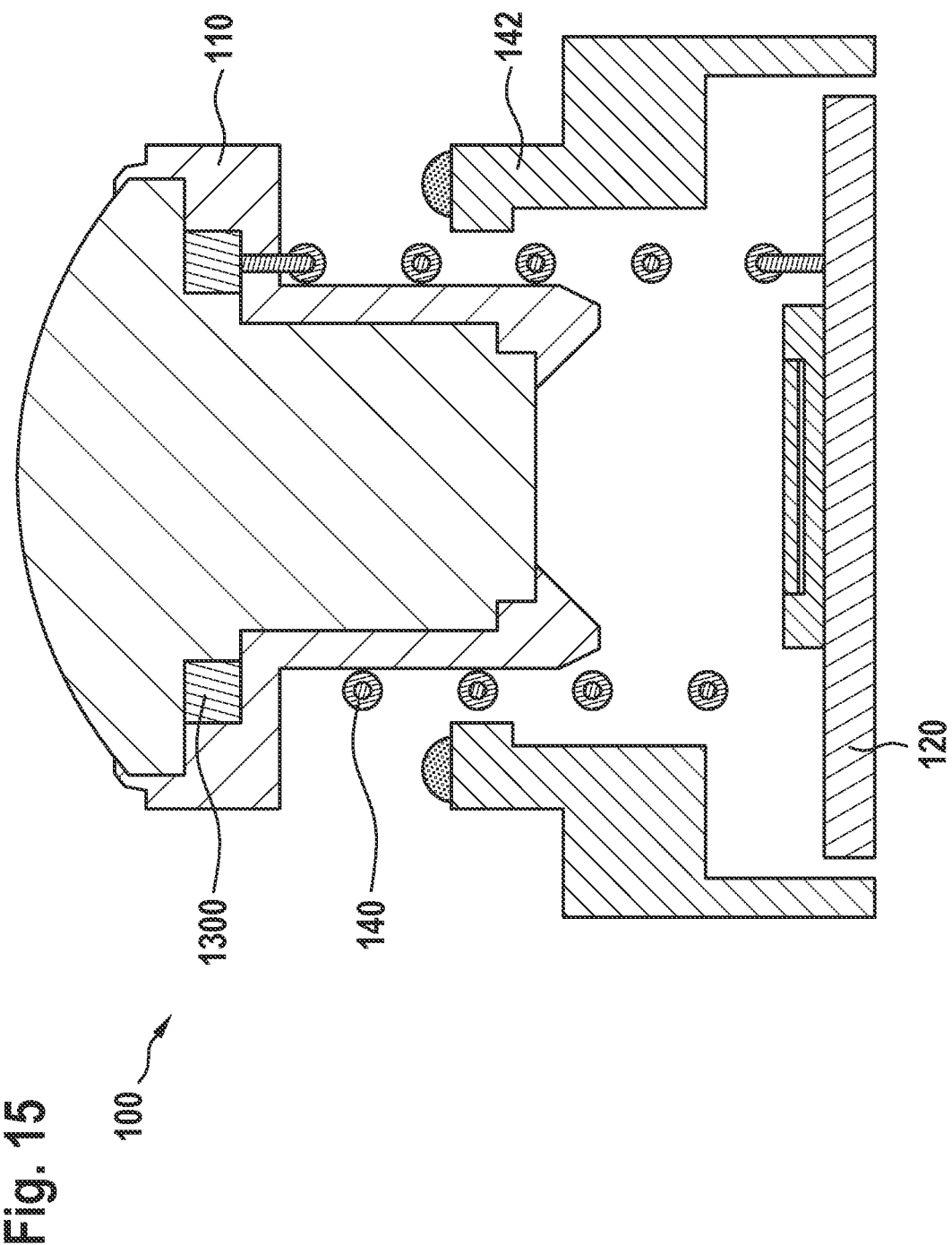
FIG. 15 schematically shows a sectional view of one exemplary embodiment of an image detection unit, in accordance with the present invention.

FIG. 15 schematically shows a sectional representation of one exemplary embodiment of an image detection unit 100. Image detection unit 100 represented here corresponds to image detection unit 100 described in FIG. 13. The only difference is that according to this exemplary embodiment it is represented in a mounting position, for example, during a manufacturing process, which means that objective 110 is not connected to objective holder 142. Instead, contacting element 140 according to this exemplary embodiment is already electrically connected to objective 110 together with heating unit 1300 and sensor carrier 120. Contacting element 140 is formed, for example, as a coil spring. Alternatively, contacting element 140 is implemented as a wave spring, as is represented, for example, in one of the following figures.

Figure 16:
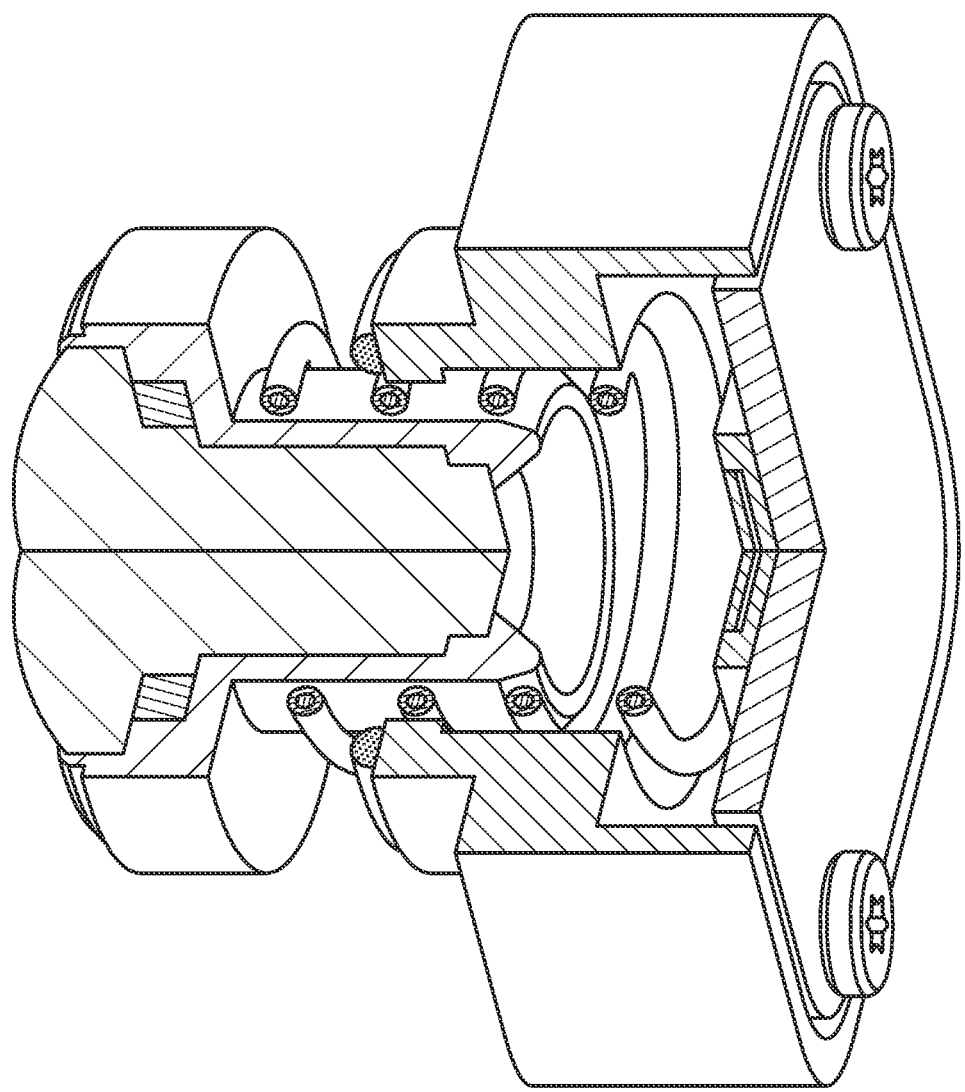
FIG. 16 shows a three-dimensional partial sectional view of one exemplary embodiment of an image detection unit, in accordance with the present invention.

FIG. 16 shows a three-dimensional partial sectional representation of one exemplary embodiment of an image detection unit 100. Image detection unit 100 represented here corresponds to image detection unit 100 described in FIG. 15. In the representation of FIG. 16, a cutout, through which the interior of image detection unit 100 is visible, is graphically executed.

Figure 17:
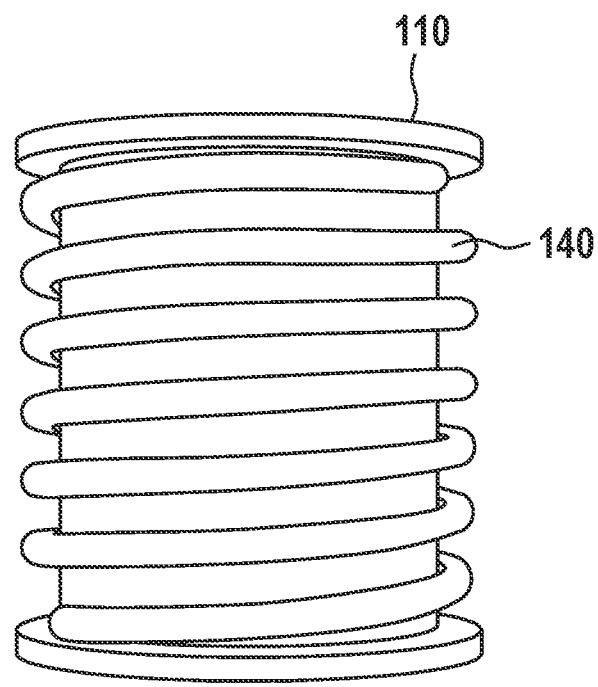
FIG. 17 shows a three-dimensional representation of one exemplary embodiment of a contacting element for an objective of an image detection unit, in accordance with the present invention.

FIG. 17 shows a three-dimensional representation of one exemplary embodiment of a contacting element 140 for an objective 110 of an image detection unit. According to this exemplary embodiment, contacting element 140 corresponds to the contacting element described in one of FIGS. 13 through 16. According to this exemplary embodiment, contacting element 140 is accordingly formed as a coil spring, which is wound around objective 110. Contacting element 140 merely optionally exhibits an elasticity.

Figure 18:
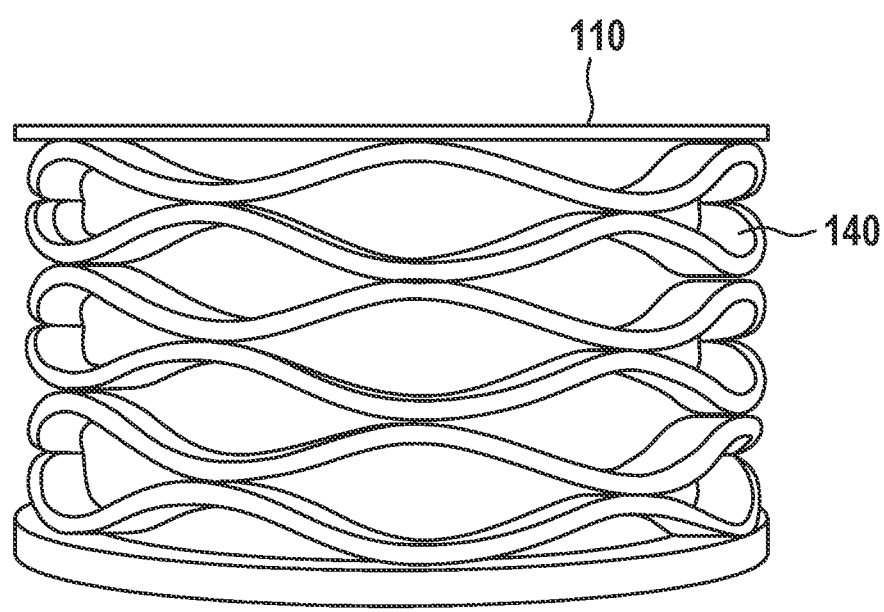
FIG. 18 shows a three-dimensional representation of one exemplary embodiment of a contacting element for an objective of an image detection unit, in accordance with the present invention.

FIG. 18 shows a three-dimensional representation of one exemplary embodiment of a contacting element 140 for an objective 110 of an image detection unit. Contacting element 140 represented here is similar to at least one of contacting elements 140 described in FIGS. 1 through 17. According to this exemplary embodiment, however, contacting element 140 is implemented as a wave spring. Here, too, contacting element 140 wraps around objective 110 and is designed to establish the electrical connection between objective 110 and the sensor carrier of the image detection unit.

Figure 19:
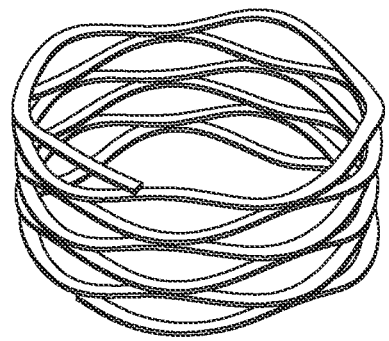
FIG. 19 shows a three-dimensional representation of one exemplary embodiment of a contacting element for an objective of an image detection unit, in accordance with the present invention.

FIG. 19 shows a three-dimensional representation of one exemplary embodiment of a contacting element 140 for an objective of an image detection unit. Contacting element 140 represented here corresponds to contacting element 140 described in FIG. 18. In this case, contacting element is 140 is represented as a wave spring, only without the objective.

Figure 20:
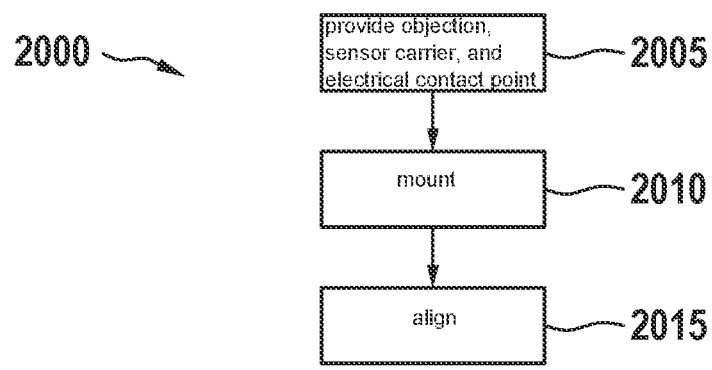
FIG. 20 shows a flowchart of one exemplary embodiment of a method for manufacturing an image detection unit, in accordance with the present invention.

FIG. 20 shows a flowchart of one exemplary embodiment of a method 2000 for manufacturing an image detection unit. By carrying out method 2000, an image detection unit is manufactured, as it is shown in at least one of FIGS. 1 and/or 3 through 16. Method 2000 is, for example, implementable in an automated manner. It includes a step 2005 of providing and a step 2010 of mounting.

In step 2005 of providing, an objective including a contact surface, a sensor carrier including a detection sensor situated on the sensor carrier and an electrical contact point are provided, the detection sensor and the contact point being situated at a surface of the sensor carrier that faces the objective. Further in step 2005 of providing, a flexible contacting element is provided for an electrical connection between the contact surface of the objective and the contact point of the sensor carrier. In step 2010 of mounting, the objective, the sensor carrier, the objective holder and the contacting element are mounted, the objective being positioned facing the sensor carrier and the contact point of the sensor carrier and the contact surface of the objective being electrically connected to one another.

According to one exemplary embodiment, the contacting element is attached in step 2010 of mounting at the contact surface. According to one exemplary embodiment, the objective is moved in step 2010 of mounting in at least one direction transversely to a longitudinal axis of the image detection unit, in order to contact a magnetic end of the contacting element supported at the sensor carrier. According to this exemplary embodiment, method 2000 also optionally includes a step 2015 of aligning the objective along the longitudinal axis.

Figure 21:
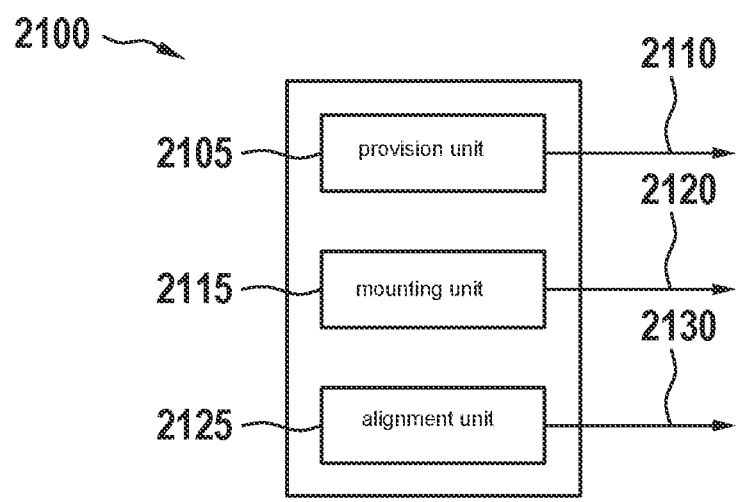
FIG. 21 shows a block diagram of a device according to one exemplary embodiment of the present invention.

FIG. 21 shows a block diagram of a device 2100 according to one exemplary embodiment. Device 2100 is designed, for example, to carry out or activate a method for manufacturing an image detection unit as it has been described, for example, in one of FIGS. 1 and/or 3 through 16. According to this exemplary embodiment, device 2100 includes for this purpose a provision unit 2105, which is designed, for example, to effectuate, using a provision signal 2110, a provision of an objective including a contact surface, a sensor carrier including a detection sensor situated on the sensor carrier and an electrical contact point, the detection sensor and the contact point being situated at a surface of the sensor carrier that faces the objective. Provision unit 2105 is further designed to effectuate a provision of a flexible contacting element for an electrical connection between the contact surface of the objective and the contact point of the sensor carrier. Device 2100 further includes a mounting unit 2115, which is designed, for example, to effectuate with the aid of a mounting signal 2120 a mounting of the objective, of the sensor carrier, of the objective holder and of the contacting element, the objective being positioned facing the sensor carrier and the contact point of the sensor carrier and the contact surface of the objective being electrically connected to one another.

Device 2100 merely optionally includes an alignment unit 2125, which is designed, for example, to effectuate with the aid of an alignment signal 2130 an alignment of the objective along the longitudinal axis.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. An image detection unit for a vehicle, comprising:
   an objective including an electrical contact surface;
   a sensor carrier including a detection sensor situated on the sensor carrier and an electrical contact point, the detection sensor and the contact point being situated at a surface of the sensor carrier that faces the objective; and
   a flexible contacting element for an electrical connection between the contact surface of the objective and the contact point of the sensor carrier;
   wherein the contacting element includes a wave spring,
   wherein the contacting element is situated around the objective to create an electrical connection between the sensor carrier and a heating unit, which extends as one piece around at least one lens of the objective,
   wherein the heating unit is situated inside an objective housing, which is formed to protect the at least one lens from external influences, and
   wherein the contacting element is electrically connectable to the heating unit with a line passing through a contact surface, and wherein at the sensor carrier, a linear side of the contacting element opposite the heating unit contacts the sensor carrier to establish the electrical connection.

2. The image detection unit as recited in claim 1, wherein the contacting element is situated helically and/or bent around the objective.

3. The image detection unit as recited in claim 1, wherein the contacting element is a ribbon cable.

4. The image detection unit as recited in claim 1, further comprising:
   a cable routing unit, wherein the contacting element is situated at the objective inside or outside the cable routing unit.

5. The image detection unit as recited in claim 1, wherein the contacting element is materially integrally and/or form-fittingly connected to the sensor carrier and/or to the objective.

6. The image detection unit as recited in claim 1, wherein the contacting element is magnetically connected to the sensor carrier and/or to the objective.

7. The image detection unit as recited in claim 1, further comprising:
   an objective holder connectable to or connected to the sensor carrier for holding the objective.

8. A method for manufacturing an image sensing unit, the method comprising:
   providing an objective including a contact surface, a sensor carrier including a detection sensor situated on the sensor carrier and an electrical contact point, the detection sensor and the contact point being situated at a surface of the sensor carrier that faces the objective, and a flexible contacting element for an electrical connection between the contact surface of the objective and the contact point of the sensor carrier; and
   mounting the objective, the sensor carrier, and objective holder and the contacting element, the objective being positioned facing the sensor carrier and the contact point of the sensor carrier and the contact surface of the objective being electrically connected to one another;
   wherein the contacting element includes a wave spring,
   wherein the contacting element is situated around the objective to create an electrical connection between the sensor carrier and a heating unit, which extends as one piece around at least one lens of the objective,
   wherein the heating unit is situated inside an objective housing, which is formed to protect the at least one lens from external influences, and
   wherein the contacting element is electrically connectable to the heating unit with a line passing through a contact surface, and wherein at the sensor carrier, a linear side of the contacting element opposite the heating unit contacts the sensor carrier to establish the electrical connection.

9. The method as recited in claim 8, wherein in the step of mounting, the contacting element is attached at the contact surface of the objective.

10. The method as recited in claim 8, wherein in the step of mounting, the objective is moved in at least one direction transversely to a longitudinal axis of the image detection unit, in order to contact a magnetic end of the contacting element supported at the sensor carrier, and including a step of aligning the objective along the longitudinal axis.

11. An apparatus to manufacture an image sensing unit, comprising:
    a device configured to perform the following:
      providing an objective including a contact surface, a sensor carrier including a detection sensor situated on the sensor carrier and an electrical contact point, the detection sensor and the contact point being situated at a surface of the sensor carrier that faces the objective, and a flexible contacting element for an electrical connection between the contact surface of the objective and the contact point of the sensor carrier; and
      mounting the objective, the sensor carrier, and objective holder and the contacting element, the objective being positioned facing the sensor carrier and the contact point of the sensor carrier and the contact surface of the objective being electrically connected to one another;
      wherein the contacting element includes a wave spring,
      wherein the contacting element is situated around the objective to create an electrical connection between the sensor carrier and a heating unit, which extends as one piece around at least one lens of the objective,
      wherein the heating unit is situated inside an objective housing, which is formed to protect the at least one lens from external influences, and wherein the contacting element is electrically connectable to the heating unit with a line passing through a contact surface, and wherein at the sensor carrier, a linear side of the contacting element opposite the heating unit contacts the sensor carrier to establish the electrical connection.

12. A non-transitory machine-readable memory medium, on which is stored a computer program, which is executable by a processor, comprising:
 a program code arrangement having program code for manufacturing an image sensing, by performing the following:
  providing an objective including a contact surface, a sensor carrier including a detection sensor situated on the sensor carrier and an electrical contact point, the detection sensor and the contact point being situated at a surface of the sensor carrier that faces the objective, and a flexible contacting element for an electrical connection between the contact surface of the objective and the contact point of the sensor carrier; and
  mounting the objective, the sensor carrier, and objective holder and the contacting element, the objective being positioned facing the sensor carrier and the contact point of the sensor carrier and the contact surface of the objective being electrically connected to one another;
 wherein the contacting element includes a wave spring,
 wherein the contacting element is situated around the objective to create an electrical connection between the sensor carrier and a heating unit, which extends as one piece around at least one lens of the objective,
 wherein the heating unit is situated inside an objective housing, which is formed to protect the at least one lens from external influences, and
 wherein the contacting element is electrically connectable to the heating unit with a line passing through a contact surface, and wherein at the sensor carrier, a linear side of the contacting element opposite the heating unit contacts the sensor carrier to establish the electrical connection.

\* \* \* \* \*